(12) United States Patent
Tomek et al.

(10) Patent No.: US 9,065,923 B2
(45) Date of Patent: Jun. 23, 2015

(54) DISPLAY REPRESENTATION OF TWO DIFFERENT SIGNAL QUALITY VALUES WITHIN A SINGLE SIGNAL QUALITY INDICATOR

(71) Applicant: BlackBerry Limited, Waterloo (CA)

(72) Inventors: Edgar Vaclav Tomek, Ottawa (CA); Jin Kim, Kanata (CA)

(73) Assignee: BlackBerry Limited, Waterloo (CA)

( * ) Notice: Subject to any disclaimer, the term of this patent is extended or adjusted under 35 U.S.C. 154(b) by 58 days.

(21) Appl. No.: 13/739,379

(22) Filed: Jan. 11, 2013

(65) Prior Publication Data
US 2014/0200050 A1 Jul. 17, 2014

(51) Int. Cl.
- *H04Q 7/10* (2006.01)
- *H04M 1/725* (2006.01)
- *H04B 17/23* (2015.01)
- *H04B 17/318* (2015.01)

(52) U.S. Cl.
CPC ........... *H04M 1/72519* (2013.01); *H04B 17/23* (2015.01); *H04B 17/318* (2015.01)

(58) Field of Classification Search
CPC .. H04W 36/0022; H04W 88/02; H04W 84/12
USPC ................... 455/132, 134, 226.2, 436, 64.11; 370/332–334
See application file for complete search history.

(56) References Cited

U.S. PATENT DOCUMENTS

| | | | |
|---|---|---|---|
| 7,450,958 B2 | 11/2008 | Shim et al. | |
| 7,606,543 B1 * | 10/2009 | Seppanen | 455/226.2 |
| 7,660,565 B2 * | 2/2010 | Patel et al. | 455/132 |
| 7,756,485 B2 | 7/2010 | Paas et al. | |
| 7,761,119 B2 * | 7/2010 | Patel | 455/566 |
| 2006/0205371 A1 | 9/2006 | Kitani et al. | |
| 2007/0189259 A1 | 8/2007 | Sollenberger et al. | |
| 2008/0009324 A1 | 1/2008 | Patel | |
| 2009/0111526 A1 | 4/2009 | Masri | |
| 2014/0153543 A1 * | 6/2014 | Shipley et al. | 370/331 |

OTHER PUBLICATIONS

CS Fallback Function for Combined LTE and 3G Circuit Switched Services—NTT DOCOMO Technical Journal vol. 11 No. 3.
QUALCOMM—Circuit-switched fallback—The First Phase of Voice Evolution for Mobile LTE Devices.
European Search report from corresponding EP application 13150945.7 dated Jun. 21, 2013.

\* cited by examiner

*Primary Examiner* — Ajit Patel
*Assistant Examiner* — Julio Perez
(74) *Attorney, Agent, or Firm* — Moffat & Co.

(57) ABSTRACT

A device and method for displaying a signal quality indicator representation on a mobile device is disclosed. Signal quality values for two different wireless networks is determined. The signal quality indicator is displayed in a banner area on a display of the mobile device providing a graphic representation displaying both of the signal quality values. One of the signal quality values is associated with a first color and the other value is associated with a second color. Where portions of the first signal quality values overlap, a combined representation associated with a third color is displayed. The signal quality indicator is at least one bar of a plurality of graduated bars.

23 Claims, 4 Drawing Sheets

DISPLAY REPRESENTATION OF TWO DIFFERENT SIGNAL QUALITY VALUES WITHIN A SINGLE SIGNAL QUALITY INDICATOR

TECHNICAL FIELD

The present disclosure relates to user interfaces for mobile devices and in particular to displaying signal quality indicators for wireless networks in the user interface of the mobile devices.

BACKGROUND

Mobile cellular devices can often be connected to two different cellular network technologies at the same time (for example 1XRTT+EVDO, or UMTS+LTE, etc). Mobile devices may transition between wireless technologies when radio frequency (RF) coverage is insufficient or the network is not capable of providing the service requested by the mobile device. For example, in networks that are only capable of data (LTE and EVDO), circuit-switched fallback (CSFB) or Simultaneous Voice and LTE data (SVLTE) operation of the mobile device is required to provide voice services via a circuit switched capable WWAN. The mobile device will need to have access to two different network access technologies to provide both data (packet switched) and voice (circuit switched) either simultaneously or sequentially. depending on the radio architecture of the mobile device. Each network technology has its own signal quality indicator (such as RSSI), which is usually represented on a mobile device such as a smartphone, in the form of signal bars displayed in the user interface so that user know what coverage is available. As different cellular or mobile wireless networks do not necessarily have the same RF coverage or network layout, the signal strength received by a mobile device and resulting quality can vary at a location for each cellular or mobile wireless network technology. However, typically only one signal quality indicator displayed to the user in a single visual set of signal quality or signal bars, which is usually the primary or faster access data network. When the service requested by a user, such as a voice call, does not use the primary network technology (EVDO or LTE), the signal quality indicator does not provide a true indication of RF quality to the user when the requested service requires the alternate or secondary network. As a result when the user requires access to the second network the service may fail, such as a voice call, even when the user believes signal quality is good based upon the primary network display in the signal quality indicator. Some mobile devices implement two separate/independent signal indicators in the display of the mobile device, however this is not advisable as it requires additional display area providing a poor visual design. Alternatively, some implementations provide a display that switches back and forth between two signal indicator sources based upon the active network which will not provide an indication of signal quality before a network transition occurs.

Accordingly, methods and devices display two signal quality indicators simultaneously remains highly desirable.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
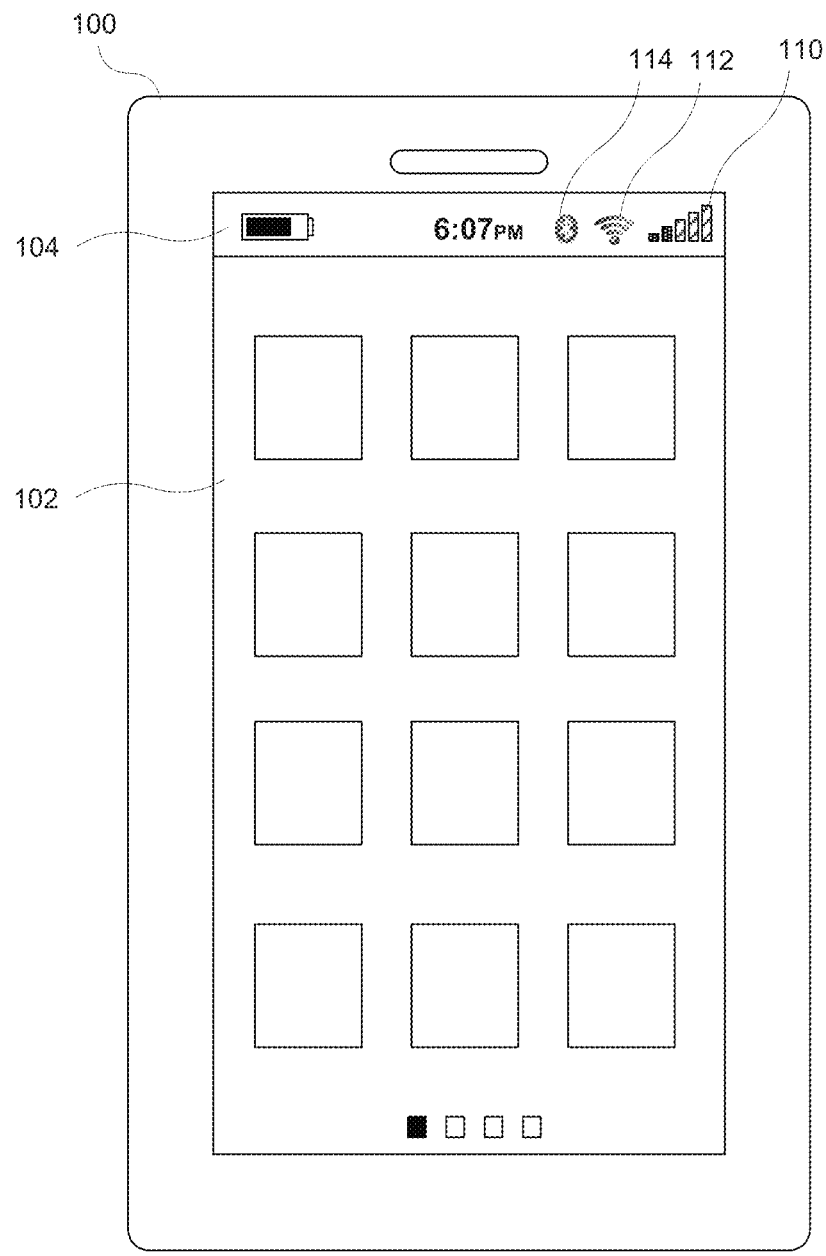
FIG. 1 shows a mobile device for displaying a signal quality indicator.

In accordance with an aspect of the present disclosure there is provided a method of displaying a signal quality indicator representation on a mobile device, the method comprising: determining a first signal quality value of a first wireless network; determining a second signal quality value of a second network; and displaying the signal quality indicator in a banner area on a display of the mobile device providing a single graphic representation displaying both of the first signal quality value and the second signal quality value.

In accordance with another aspect of the present disclosure there is provided a mobile device comprising: a processor; a display responsive to the processor; a plurality of wireless transceivers responsive to the processor; and a memory accessible to the processor and storing program code executable by the processor for executing a user interface application; wherein the user interface application is configured to: determining a first signal quality value of a first wireless wide area network from a first wireless transceiver of the plurality of wireless transceivers; determining a second signal quality value of a second wide area network from a second wireless transceiver of the plurality of wireless transceivers; and displaying the signal quality indicator in a banner area on a display of the mobile device providing a single graphic representation displaying both of the first signal quality value and the second signal quality value.

In accordance with another aspect of the present disclosure there is provided a computer readable memory containing instructions for displaying a signal quality indicator representation on a mobile device, the instructions when executed by a processor performing: determining a first signal quality value of a first wireless network; determining a second signal quality value of a second network; and displaying the signal quality indicator in a banner area on a display of the mobile device providing a single graphic representation displaying both of the first signal quality value and the second signal quality value.

Embodiments are described below, by way of example only, with reference to FIGS. 1 to 4. In mobile devices that may utilize multiple access technologies, the signal quality indicators for each network are displayed separately. For example wireless local area networks (WLAN), such as Wi-Fi, and wireless wide area networks (WWAN) mobile network indicators may be represented by different symbols in a banner area of the user interface as each network may be used independently of each other. However when a mobile device is capable of accessing two WWAN technologies, and in fact may need to access two WWAN technologies to provide voice and data service, the user may not be provided with a good indication of signal quality of both networks as only one set of signal quality bars or signal strength bars are presented. For example in Circuit Switched Fall-back (CSFB) or Simultaneous Voice and LTE data (SVLTE) for devices that utilize data only networks such as LTE (Long Term Evolution) or EVDO (Evolution-Data Optimized) and are not optimized for providing circuit switched voice calls, the device will show the primary signal quality indicator but not a signal quality indicator of the secondary network that the voice call would utilize when CSFB or SVLTE functionality is implemented via a voice capable 2G/3G network. A user may be misled to believe that they have good signal coverage for a voice call when they only have signal coverage for data service, or vice versa as only one WWAN indicator is displayed.

In order to address this issue, a combined signal quality indicator is provided that can simultaneously display both network signal quality indicator values in a single signal quality indicator in the user interface of the mobile device when two WWAN technologies are utilized in the mobile device. Two different signal quality indicators are displayed in a single set of signal bars by using the combination (addition/subtraction) of colors in a single service indicator. Each signal quality indicator for the associated WWAN is associated with its own color, and the color of each bar represents the presence or absence of RF signal or service provided by the network.

FIG. 1 shows a mobile device for displaying a signal quality indicator. The mobile device 100 has a display 102 providing a banner area 104 in a user interface of an operating system of the device. The banner area 104 presents status information to the user in the home screen or accessible from within applications. The banner area 104 may present status information such as time, battery status, message notification and connectivity information of the device by presenting service indicators associated with one or more wireless technologies or networks. For example an indicator 110 may be associated with WWAN connectivity such as LTE, Universal Mobile Telecommunications System (UMTS), Global System for Mobile Communications (GSM), General Packet Radio Service (GPRS), Enhanced Data rates for GSM Evolution (EDGE), Code Division Multiple Access (CDMA), 1x (single-carrier) Radio Transmission Technology (1XRTT) CDMA or 1XCDMA, EVDO, High Speed Packet Access (HSPA), HSPA+ networks etc. The WWAN technology that the device is operating on may not provide all the services required by the device, for example a WWAN technology may only be data capable where as others may be voice and data capable but at lower data rates. Other network indicators may be displayed, for example indicator 112 may identify connectivity with a WLAN, such as Wi-Fi™, and another indicator 114 may identify wireless short-range network connectivity such as Bluetooth™.

Figure 2:
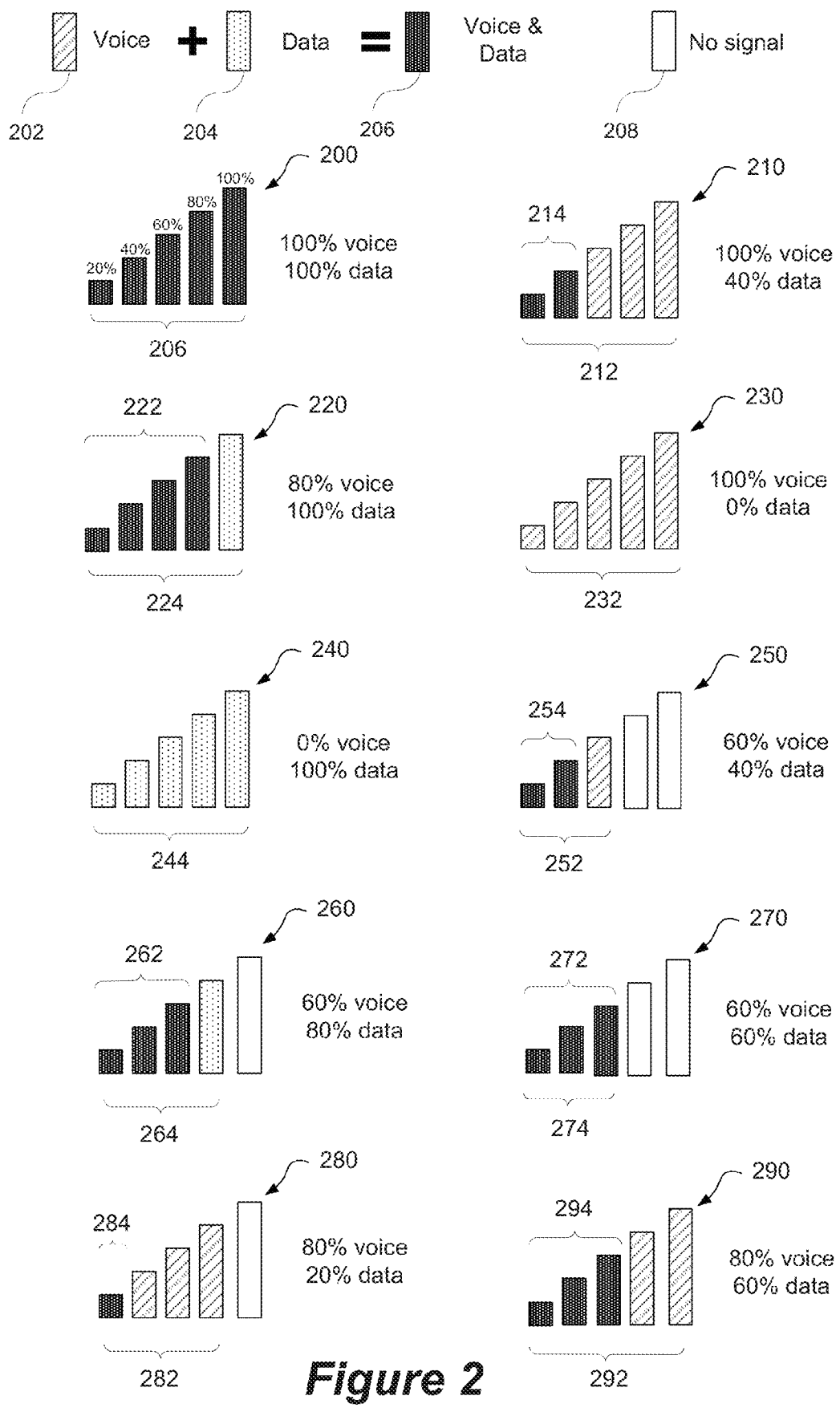
FIG. 2 shows representation of some possible signal quality indicator combinations.

FIG. 2 shows representation of some possible signal quality indicator combinations. The signal quality indicator is displayed as at least one bar of a plurality of graduated bars providing a graduated range to easily display signal quality or signal strength. When a mobile device can access two different WWAN technologies, for example 1XCDMA for voice and EVDO for data, or 2G/3G for voice and LTE for data, each network technology can each have their own signal quality. During normal operation the user may not be aware that the device may utilize more than one network technologies, for example in CFSB or SVLTE capable devices. The mobile device will display a signal quality indicator associated with the network of primary access technology, usually the higher speed network such as LTE or EVDO.

The signal quality, which may be associated with signal strength, can be presented in the signal quality indicator defining a relative indicator for example 0%-100% range. The signal quality indicator may not provide an exact signal quality value but be divided into ranges, for example, 0%-20%, 20-40%, 40%-60%, 60%-80% and 80%-100%, although other numeric ranges may be utilized. The graduated bars may not provide a direct linear representation relative to the signal quality values, but define an indication of a defined service quality (for example poor, fair, good, excellent) each having an associated range of values rather than providing an absolute value for quality. In a mobile device that can access multiple WWAN technologies, and may adaptively switch between technologies, the signal quality indicator that is displayed is the primary WWAN and not the secondary WWAN on which the actual communication ends up being established in a CSFB or SVLTE scenario. In order to address this issue of not displaying an accurate representation of the WWAN service, a combined signal quality indicator in a single graphic representation is provided where the signal quality value for each network technology can be assigned a visual characteristic such as a color for each one and presented in a single signal quality indicator, for example:

(voice=yellow)—first network
(data=blue)—second network
(voice+data=yellow+blue=green)

Although the examples described are in relation to the use of yellow and blue being combined to form green, other colors may be utilized to represent the different network signal quality values. In addition the colors may not necessarily be primary colors which can be combined or added to create the third color. Alternatively the signal quality indicator representing the networks may be for identification relative to other service offerings such as speed, quality of service, access technology or pricing rather than being limited to a quality of service indicator defining voice or data capable networks.

In FIG. 2, the different visual characteristics of the signal quality bars are illustratively presented as different patterns but may be associated with colors. Each graduated signal strength indicator bar may visually represent the signal quality for one or two WWAN, for example a good quality signal for voice 202 may have a first shading or color, data 204 may have a second shading or color, and combined voice and data 206 may have a third shading or color. In addition an empty bar may be presented for no signal 208. The graphic 200, each bar in the signal strength graphic represents a signal strength value. Five bars are shown to represent a 100% signal 206 for both voice and data networks. In this example as both networks are at 100% the combined colors, blue and yellow, provide a green representation indicating both networks are fully available. Although five graduated bars are shown any number of bars may be displayed to define a signal quality range. Alternative graphics may be utilized as a signal quality indicator such as a triangle or curved lines where portions of the graphic would be displayed or colored based upon the received signal quality.

The signal strength indicator graphic 210 shows a representation where the voice network signal strength value 212 represents 100% strength, and the data network signal strength value 214 represents 40% strength. The common or combined bars representing 40% strength would be represented as green indicators bars.

The signal quality indicator graphic 220 shows a representation where the voice network signal quality value 222 represents 80% strength and the data network signal quality value 224 represents 100% strength. The common bars representing 80% strength would be represented as green indicators bars and the additional data bars would be represented in blue.

The signal quality indicator graphic 230 shows a representation where the voice network signal quality value 232 represents 100% strength and the data network signal quality value 234 represents 0% strength, therefore only the voice signal quality value would be represented in the signal quality indicator, and would therefore be all yellow.

The signal quality indicator graphic 240 shows a representation where the voice network signal quality value 242 represents 0% strength and the data network signal quality value 244 represents 100% strength, therefore only the data signal quality value would be represented in the signal quality indicator, and would therefore be all yellow.

The signal quality indicator graphic 250 shows a representation where the voice network signal quality value 252 represents 60% strength and the data network signal quality value 254 represents 40% strength. The common bars representing 40% strength would be represented as green indicators bars and an additional 20% bar would be yellow. The remaining indicator bars may be empty or not displayed.

The signal quality indicator graphic 260 shows a representation where the voice network signal quality value 262 represents 60% strength and the data network signal quality value 264 represents 80% strength. The common bars representing 60% strength would be represented as green indicators bars and the additional 20% indicator bar would be blue, and the final indicator bar would be empty or not displayed.

The signal quality indicator graphic 270 shows a representation where the voice network signal quality value 272 represents 60% strength and the data network signal quality value 274 represents 60% strength. The common bars representing 60% strength would be represented as green indicators bars. The remaining indicator bar may be empty or not displayed.

The signal quality indicator graphic 280 shows a representation where the voice network signal quality value 282 represents 80% strength and the data network signal quality value 284 represents 20% strength. The common indicator bars representing 20% strength would be represented as green indicators bars.

The signal quality indicator graphic 290 shows a representation where the voice network signal quality value 292 represents 100% strength and the data network signal quality value 294 represented 60% strength. The common bars representing 60% strength would be represented as green indicators bars, and the final indicator bar would be empty or not displayed.

Other combination of signal quality values and indicator bars can be displayed. In addition fractional portions of the bars may also be used to present a finer signal quality values. For example, if the signal quality value is 50%, the third indicator bar may only be half colored, two and a half bars. It may also be possible to use two colors within the same indicator bar, for example data 50% and voice at 60% so half of the bar would be green and the other half yellow. Alternatively, the colors may not necessarily be primary colors that can be added together. Any combination of identifiable colors or shades may be utilized to represent the signal quality of the primary (or first) WWAN and the secondary (or second) WWAN and the combination therein. In addition, the signal quality values may be presented based upon changes to one or more visual characteristic of the signal quality indicator graphic. For example the visual characteristics may be associated with shading, shape, line thickness, color, or texture may be used to define the different signal quality for WWAN and to determine a combined representation of the signal quality values.

Figure 3:
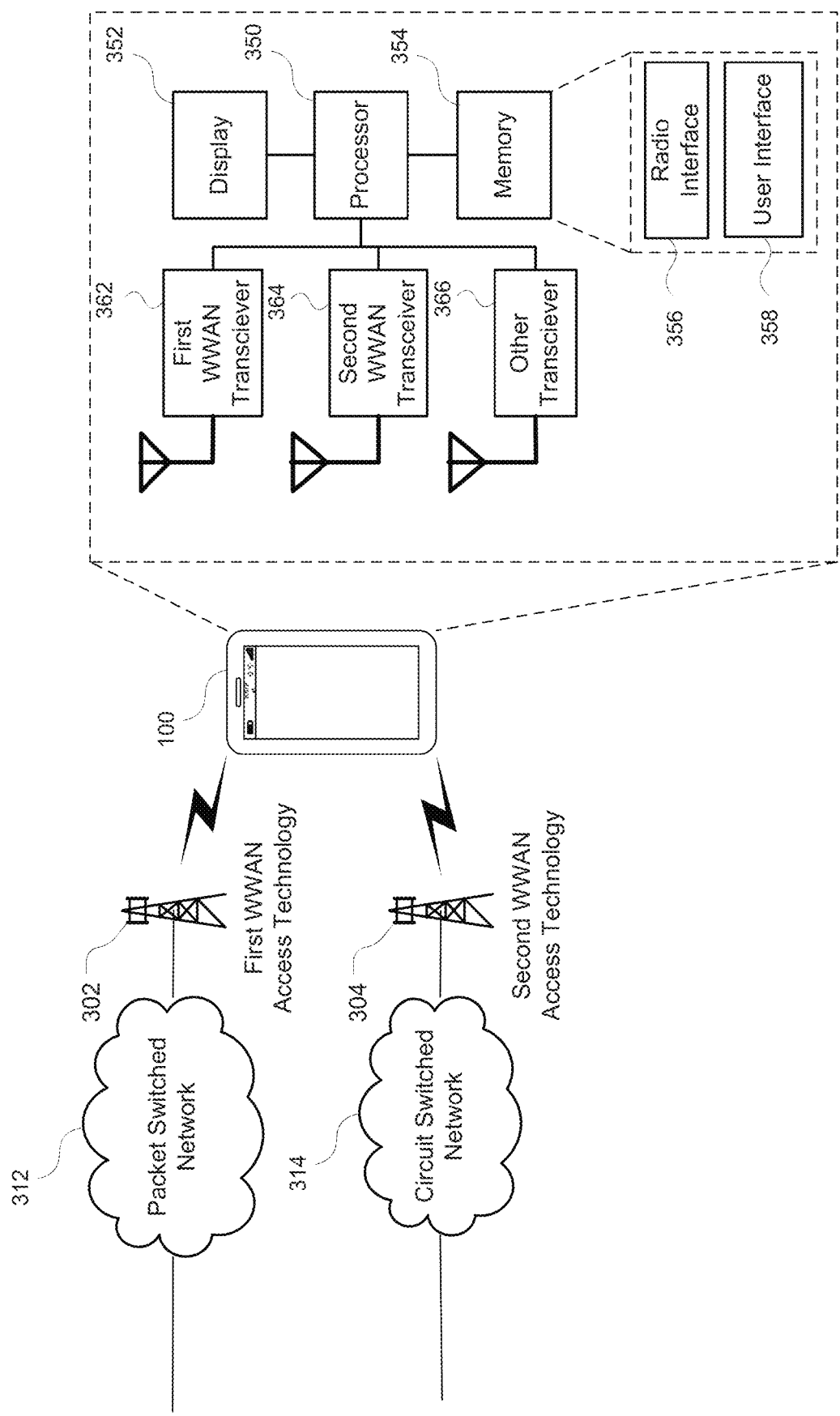
FIG. 3 shows a system representation of a mobile device for displaying a signal quality indicator.

FIG. 3 shows a system representation of a mobile device for displaying a signal quality indicator. The mobile device 100 is capable of communication through at least a first wireless access technology 302 and a second wireless access technology 304 for communication with different WWANs, although the networks may be part of the same service provider network. In this example the first wireless access technology 302 is coupled to a packet switched network 312 and the second wireless access technology 304 is coupled to a circuit switched network 314. The selection of which wireless access technologies used by the mobile device 100 may be dependent on which service the device 100 is to provide, such as voice or data, or based upon network availability defined by RF coverage. For example, if only data access is required the first wireless access technology 302 may be utilized as it is optimized for packet data access, however when voice call are performed, the second wireless access technology 304 is utilized as it is optimized for circuit switched voice access. Multiple access technologies may also be utilized in fallback scenarios between technologies where wireless coverage may not be as extensive for one wireless access technology as compared to another. In a voice fallback scenario, the second wireless access technology 304 may also be capable of packet data transmission, but may not be as fast as the first wireless access technology 302. For example, the first wireless access technology 302 may be a data only capable radio such as LTE or EVDO technology network not capable of providing voice communication, where as the second wireless access technology 304 may be a 2G/3G network which can provide voice or circuit switched calls. The mobile device 100 may comprise components such as a processor 350 coupled to a display 352 and a memory 354. The processor 350 may be coupled to a first WWAN transceiver 362 and a second WWAN transceiver 364. The wireless transceivers may form separate components or be part of a chip or chipset which integrates the processor 350 and the transceiver or radio functionality. The transceiver provides combined transmitter and receiver functionality which is coupled to an antenna for transmitting and receiving data from the WWAN. The processor 350 may also incorporate additional transceivers 366 that for different wireless local area network (WLAN), Wi-Fi, and/or short-range such as Bluetooth communication functions independent of the wide-area network transceivers. The processor 350 may also incorporate graphics and multimedia functions. Each WWAN transceiver can communicate with one or more WWAN access technologies. For example first WWAN transceiver 362 may be capable of 4G wireless communications and second WWAN transceiver 364 may be capable of 3G/2G communications. Alternatively first WWAN transceiver 362 may be capable of EVDO communications where as second WWAN transceiver 364 may be capable of 1XCDMA. Although dual radio configuration is illustrated, first WWAN transceiver 362 and second WWAN transceiver 364 may be integrated in a single radio subsystem. The mobile device 100 may be capable of accessing both network simultaneously through both transceivers in a dual radio configuration such as in a SVLTE (e.g. CDMA 1X+LTE configuration) or the transceivers may be provided in a single radio configuration where only one WWAN can be accessed at a time. In a single radio configuration the signal quality values may be determined during idle windows on the primary network allowing the radio to switch between network access technologies periodically to determine service indicator values. The memory 354 may be non-transitory memory for storing instructions for execution by the processor 350 to provide an operating system for the mobile device 100. The memory may also provide instructions for interfacing with the transceivers by a radio interface 356 to determine the signal quality values and for presenting the user interface 358 to display the banner area and the signal quality indicator.

A mobile device having multiple WWAN transceivers can be utilized in CSFB or SVLTE operational scenarios which enables circuit switched and data network access on the same device through different networks, when the data network access technology does not support voice (circuit switched) calls. For example legacy 2G/3G networks and LTE networks can be accessible to the same device, where the LTE network does not provide voice communications and may fall back on 1XCDMA or a GSM based network to provide voice communications. Similarly EVDO network technology may be a primary network and fall back to 1XCDMA network technology when a voice call is to be sent or received from the wireless device. The mobile device operates on a primary data network, for example LTE or EVDO as it provides higher data rates for data transmission rather than a legacy 2G/3G network. When a circuit switched call (CS call) is originated or received the device will fall back to the network 2G/3G CS call capable network, which may also support lower data speed and would not be preferential for regular data connectivity. During operation of the device the signal indicator can typically only show a single signal quality indicator of the primary network. However as the device must use the fall back network to provide voice service the quality of the fall back network may be different than the primary network resulting in the loss or drop of the connection when attempting a voice call. The ability to provide a signal quality indicator that can identify two different WWAN network signal quality values for packet data and circuit switched networks improves the ability to discern how data and voice services will perform for a user. Alternatively, the mobile device may be capable of accessing two networks based upon different service offerings provided by each of the networks and the presentation of single signal strength indicator would be beneficial to the user, and should not be limited to a voice and data scenario. For example the networks may provide different or tiered data rates, quality of service levels, access technology or pricing options. Both network may be accessible by the wireless device and may be used by the mobile device based upon different user or application requirements. For example a first network may be used for video calls due to speed, whereas a second network may be used for low speed data such as e-mail or text messaging based upon pricing and speed throttling. The signal quality values may be a combination of the two different networks in a signal quality indicator enabling the user to identify the signal quality of both networks which may provide different service offerings to the mobile device.

Figure 4:
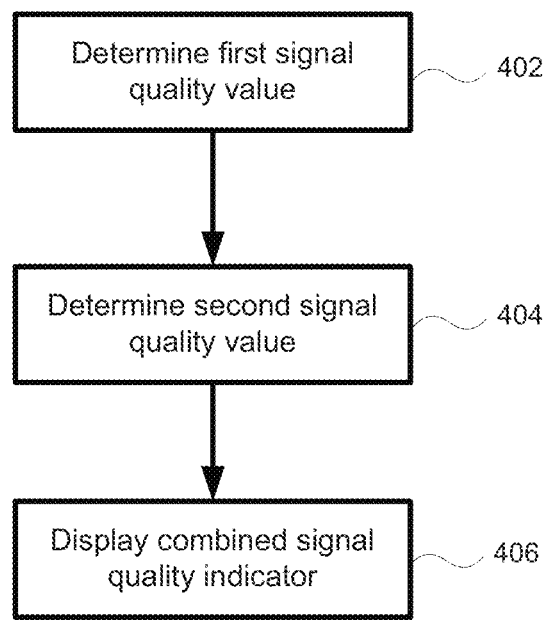
FIG. 4 shows a method of displaying a combined signal quality indicator.

FIG. 4 shows a method of displaying a signal quality indicator. A signal quality value for a first wireless network is determined (402), which may be the primary network which the device provides default access to. The first wireless network uses a WWAN access technology, for example providing packet switched service. The signal quality value may be Received Signal Strength Indication (RSSI), Reference Signal Received Power (RSRP), Reference Signal Received Quality (RSRQ), $E_b/N_0$ (the energy per bit to noise power spectral density ratio) or similar indicator based upon the WWAN access technology. The signal quality value may be a power measurement represented as a dB value or relative value based upon a defined range of values (for example 1 out of 10). A signal quality value for a second wireless network is determined (404) where the second wireless network uses a WWAN access technology different from the first WWAN which provides different services to the device, for example providing circuit switched (voice) service. The two signal quality values may need to be scaled or converted to comparable range, for example one may be RSSI while the other may be Eb/No. The values are then mapped relative to a signal quality indicators such as a defined range from 0% to 100% signal quality. The signal quality indicator is typically presented as series of graduated bars representing increased signal quality. The representation of the signal quality indicator is then determined and displayed in a single graphic representation (406) on a display of the mobile device in a banner area.

The signal quality indicator provides a combined representation of the first signal quality value and the second signal quality value in a single graphic representation, when each signal quality value is represented by a color, each color being additive to provide a third color when the colors of the first and second signal quality values are added together. The colors may be primary colors which can be combined to produce additional colors. For example the first signal quality value may be associated with the color blue; the second signal quality value may be associated with yellow, where the additive combination would be green where the indicators overlap. In this manner the user can identify the status of both WWAN access technologies in the single signal quality indicator graphical representation. The signal quality values may need to be scaled to a common scheme or scale particularly if the values for signal quality for each WWAN technology are received in a different format or range of values.

Although certain methods, apparatus, computer readable memory, and articles of manufacture have been described herein, the scope of coverage of this disclosure is not limited thereto. To the contrary, this disclosure covers all methods, apparatus, computer readable memory, and articles of manufacture fairly falling within the scope of the appended claims either literally or under the doctrine of equivalents.

Although the following discloses example methods, system and apparatus including, among other components, software executed on hardware, it should be noted that such methods, system and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods, system and apparatus.

The invention claimed is:

1. A method of displaying a signal quality indicator representation on a mobile device, the method comprising:
   determining a first signal quality value of a first wireless network;
   determining a second signal quality value of a second network; and
   displaying the signal quality indicator comprising a plurality of graduated bars in a banner area on a display of the mobile device, the signal quality indicator providing a combined graphic representation displaying both of the first signal quality value and the second signal quality value wherein the first signal quality value represented by the plurality of graduated bars is associated with a first color and the second signal quality represented by the plurality of graduated bars is associated with a second color different from the first color, wherein when portions of the first signal quality value and the second signal quality value overlap, one or more respective bars of the plurality of graduated bars is associated with a third color different from the second color.

2. The method of claim 1 wherein the first and second signal quality value are each signal quality indicators of respective wireless wide area networks (WWAN).

3. The method of claim 2 wherein the first wireless network provides packet switched service and the second network providing circuit switched service.

4. The method of claim 2 wherein the signal quality value represents signal strength.

5. The method of claim 2 wherein each bar of the plurality of graduated bars define a percentage associated with the signal quality value.

6. The method of claim 1 wherein the third color is an addition of the first color and the second color.

7. The method of claim 1 wherein the first color is blue, the second color is yellow, and the third color is green.

8. The method of claim 1 wherein the first network is a long-term evolution (LTE) network and the second network is a 2G/3G network.

9. The method of claim 1 wherein the first network is an evolution data optimized (EVDO) network and the second network is a 1XRadio Transmission Technology (RTT) network.

10. The method of claim 1 wherein displaying the signal quality indicator comprising scaling the first signal quality value and the second signal quality value to a common signal quality scale.

11. The method of claim 1 wherein the first signal quality value is associated with a first color and the second signal quality value is associated with a second color, wherein when portions of the first signal quality value and the second signal quality value overlap, a combined representation associated with a third color.

12. A mobile device comprising:
a processor;
a display responsive to the processor;
a plurality of wireless transceivers responsive to the processor; and
a memory accessible to the processor and storing program code executable by the processor for executing a user interface application; wherein the user interface application is configured to:
determining a first signal quality value of a first wireless wide area network from a first wireless transceiver of the plurality of wireless transceivers;
determining a second signal quality value of a second wide area network from a second wireless transceiver of the plurality of wireless transceivers; and
displaying a signal quality indicator comprising a plurality of graduated bars in a banner area on a display of the mobile device, the signal quality indicator providing a combined graphic representation displaying both of the first signal quality value and the second signal quality value, wherein the first signal quality value represented by the plurality of graduated bars is associated with a first color and the second signal quality represented by the plurality of graduated bars is associated with a second color different from the first color, wherein when portions of the first signal quality value and the second signal quality value overlap, one or more respective bars of the plurality of graduated bars is associated with a third color different from the second color.

13. The mobile device of claim 12 wherein the first and second signal quality value are each signal strength indicators of respective wireless wide area networks (WWAN).

14. The mobile device of claim 13 wherein the first wireless network provides packet switched service and the second network providing circuit switched service.

15. The mobile device of claim 13 wherein the first color is blue, the second color is yellow, and the third color is green.

16. The mobile device of claim 13 wherein the first network is a long-term evolution (LTE) network and the second network is a 2G/3G network.

17. The mobile device of claim 13 wherein the first network is an evolution data optimized (EVDO) network and the second network is a 1XRadio Transmission Technology (RTT) network.

18. The mobile device of claim 13 wherein displaying the signal quality indicator comprising scaling the first signal quality value and the second signal quality value to a common signal quality scale.

19. The mobile device of claim 12 wherein each of the plurality of graduated bars define a percentage associated with the signal quality value.

20. The mobile device of claim 12 wherein the third color is an addition of the first color and the second color.

21. The mobile device of claim 12, wherein fractional portions of the bars are used to present finer signal quality values.

22. A non-transitory computer readable memory containing instructions for displaying a signal quality indicator representation on a mobile device, the instructions when executed by a processor performing:
determining a first signal quality value of a first wireless network;
determining a second signal quality value of a second network; and
displaying the signal quality indicator comprising a plurality of graduated bars in a banner area on a display of the mobile device, the signal quality indicator providing a combined graphic representation displaying both of the first signal quality value and the second signal quality value, wherein the first signal quality value represented by the plurality of graduated bars is associated with a first color and the second signal quality represented by the plurality of graduated bars is associated with a second color different from the first color, wherein when portions of the first signal quality value and the second signal quality value overlap, one or more respective bars of the plurality of graduated bars is associated with a third color different from the second color.

23. The method of claim 1, wherein fractional portions of the bars are used to present finer signal quality values.

* * * * *